Dec. 14, 1965    C. G. HOLMAN    3,222,976
THEFT PREVENTION DEVICE FOR AUTOMOBILE WHEELS
Filed Jan. 6, 1964
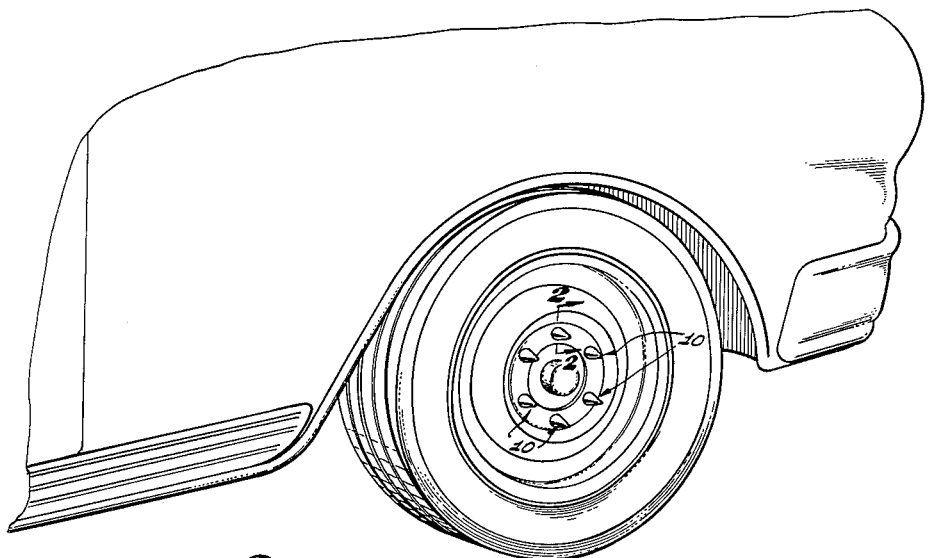
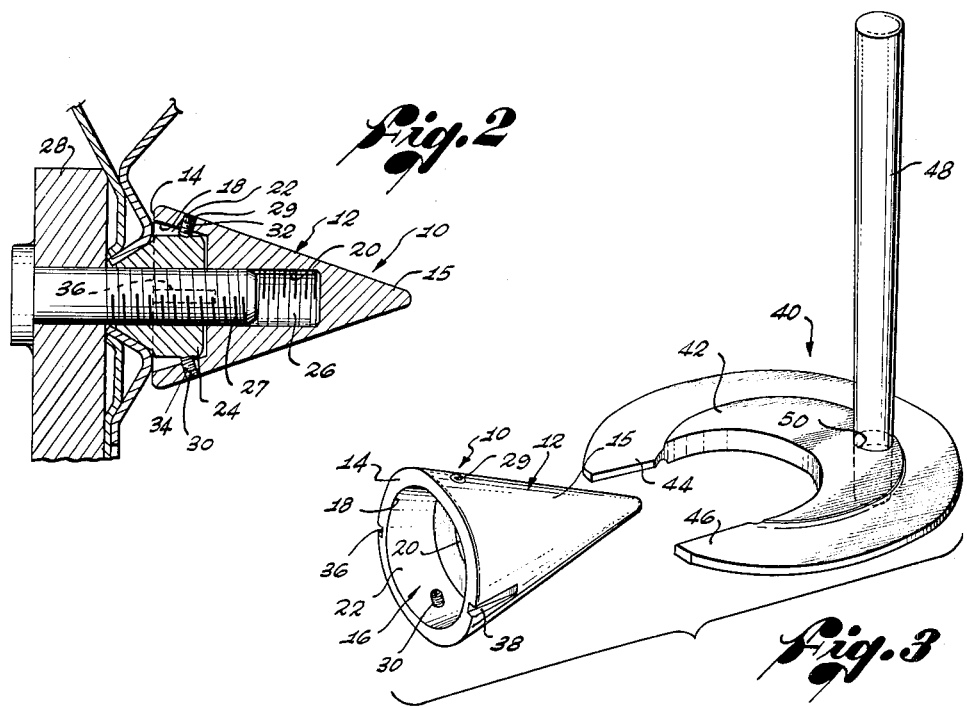
INVENTOR.
CHARLES G. HOLMAN
BY Fulwider, Patton, Rieber,
Lee, and Utecht
ATTORNEYS United States Patent Office 3,222,976
Patented Dec. 14, 1965

3,222,976
THEFT PREVENTION DEVICE FOR AUTOMOBILE WHEELS
Charles G. Holman, 1327 W. 42nd St., Los Angeles, Calif.
Filed Jan. 6, 1964, Ser. No. 335,918
4 Claims. (Cl. 85—56)

My invention relates to theft prevention devices, and more particularly, to a novel theft-proof cover for lug nuts and the like which is particularly useful in covering the lug nuts employed in the mounting of an automobile wheel to prevent unauthorized removal of the wheel.

For many years, the theft of wheels and tires from unattended automobiles has been a serious problem not only for law enforcement officers but also for the individuals who are the victims of the thefts. In an attempt to prevent such thefts from being successfully executed, various forms of theft prevention apparatus have been devised. One such device is the hub cap lock, generally located at the rim of the wheel. Unfortunately however, such locks are relatively fragile and have proven only partially effective in preventing wheel thefts.

Another type of device for preventing the theft of automobile wheels is the nut lock. In general, nut locks include a hollow cover member adapted to fit over the lug nuts employed in mounting a wheel to the axle of an automobile. Conventional nut locks also incorporate rather complex key-actuated mechanisms of interlocking movable elements for physically locking the covers to the lug nuts. Due to the complexity of their design, conventional nut locks have proven to be expensive to manufacture. Moreover, in practice, conventional nut locks have been found to be somewhat unreliable in their locking operation and for these reasons have found only limited commercial acceptance.

In view of the foregoing, it is a principal object of my invention to provide an inexpensive and fully reliable device for preventing unauthorized removal of wheels from automobiles and the like.

It is another object of my invention to provide an inexpensive cover device for lug nuts and the like which when employed to cover the lug nuts associated with a mounted automobile wheel prevent unauthorized removal of the wheel from the automobile.

A further object of my invention is to provide a theft-proof nut cover which is extremely simple in design and reliable in its locking operation over lug nuts and the like.

A still further object of my invention is to provide a theft-proof nut cover which is capable of being mass-produced at a relatively low cost.

The foregoing as well as other objects and advantages of my invention may be more clearly understood by reference to the following detailed description when considered with the drawing, in which:

FIGURE 1 is a perspective representation of an automobile wheel employing the theft-proof nut covers of my invention;

FIGURE 2 is a cross-sectional view of the theft-proof nut cover illustrated in FIGURE 1; and FIGURE 3 is a perspective representation of a preferred form of the theft-proof nut cover of my invention together with a specially designed wrench which may be employed in the mounting and removal of the cover.

In general, to provide means for mounting a wheel to the axle of an automobile, a plurality of angularly displaced wheel-mounting studs extend from a drum coupled to the end portion of the axle. The studs are adapted to pass through corresponding openings in the wheel and are threaded to receive lug nuts. The lug nuts, in turn, are adapted to screw onto the studs and to press tightly against the wheel thereby securing the wheel to the drum and axle of the automobile.

When the lug nuts are screwed onto the studs, small threaded end portions of the studs, usually in the order of one-quarter to one-half inch, extend beyond the outer surfaces of the nuts. Generally speaking, I employ these extensions to provide partial means for tightly securing and locking the nut covers of my invention over the threaded studs and lug nuts to provide a theft-proof device which prevents unauthorized removal of the automobile wheel (see FIGURE 1).

More particularly, in the drawing, the theft-proof nut cover of my invention is represented by the numeral 10 and includes a hollow main body member 12 having a substantially flat rear wall 14 and a smooth continuous outer surface 15 forwardly converging from the rear wall. Preferably, the main body member 12 is formed of a metal or metal alloy such as aluminum, steel, stainless steel or bronze and the outer surface 15 is cone-shaped as illustrated. The hollow in the main body 12 is represented by the numeral 16 and is preferably bounded by a tubular inner surface 18 extending forward from the rear wall 14 and a threaded tubular inner surface 20 immediately forward of the inner surface 18. The tubular surface 18 is coaxial with the cone comprising the cover 10 and defines a rear opening 22 in the main body 12 large enough to receive a nut 24, such as that normally employed to attach a wheel to the axle of an automobile. The tubular inner surface 20 on the other hand, defines a recess 26 which extends coaxially from the rear opening 22. The recess 26 is of reduced radial dimension relative to the rear opening 22 and is adapted to threadedly receive the end portion of a threaded wheel-mounting stud 27 extending beyond the nut 24 from a drum 28 coupled to the axle of an automobile.

In addition to the main body 12, the preferred form of the cover 10 includes a pair of Allen-head screws 29 and 30. The screws are adapted for threaded reception by a pair of opposing threaded side openings 32 and 34. The side openings extend between the outer surface of the main body 12 in the rear opening 22 substantially normal to the outer surface. The screws extend into the side openings and with the heads of the screws substantially flush with the outer surface of the main body tightly engage different sides of the nut 24 to securely lock the main body about the nut.

With the main body 12 tightly secured to the threaded end of the stud 27 and the Allen-head screws pressing tightly against the sides of the nut 24, the smooth conical shape of the outer surface of the cover 10 prevents conventional wrenches from gripping and turning the cover member. Accordingly, when the cover 10 surrounds a lug nut employed to attach a wheel to the axle of an automobile, as in FIGURE 1, the cover prevents the unauthorized removal of the wheel from the automobile.

By the same token, special means are necessary to attach and remove the cover 10 from the stud 27. To this end, I provide a pair of opposing slots 36 and 38 in the outer surface of the cover member adjacent the rear wall 14. The slots 36 and 38 are adapted to receive a specially designed open-end wrench 40 (see FIGURE 3). The wrench 40 includes a U-shaped head 42 with forwardly extending gripping side portions 44 and 46 adapted to fit into the slots 36 and 38 and a tapered rod 48 adapted to fit into an opening 50 in the head of the wrench as illustrated.

In operation a rotation of the rod 50 produces a turning of the main body 12 on the stud 27 to tightly screw the main body onto the stud. The Allen-head screws 29 and 30 may be then screwed into the side openings 32 and 34 against the nut 24 to secure the cover 10 in place.

To remove the cover from the nut 24 the foregoing process is reversed. The Allen-head screws are first partially removed from the side openings employing a conventional Allen-head wrench. The main body 12 is then unscrewed from the stud 27 by turning the main body with the wrench 40.

In view of the foregoing, the nut cover of my invention provides a theft-proof device which is simple and reliable in its locking operation over lug nuts and the like. Furthermore, due to the minimal number of parts employed in my nut cover, it is relatively inexpensive and may be rapidly produced in large quantities.

When the nut covers of my invention are employed to cover the lug nuts of an automobile wheel, they, in turn, may be covered by the hub cap normally associated with the wheel. However, this is by no means necessary. In fact, the nut covers being of a generally conical shape provide a rather unique design for an automobile wheel with the hub cap removed. Accordingly, the nut covers may serve as a novelty item for modifying the external appearance of an automobile wheel as well as a safety device to prevent the unauthorized removal and theft of the wheel.

Although the nut cover of any invention has been described as being particularly adapted to the covering of lug nuts for automobile wheels, its use is by no means limited thereto. In fact, my invention may be usefully employed anywhere a locking device is required to prevent removal of a nut from a threaded stud, bolt, or shaft.

Furthermore, although a specific design of nut cover has been described in detail, it is to be understood that it is merely illustrative of my invention which is to be limited in scope only by the following claims.

I claim:

1. A theft-proof cover for covering the end of a threaded member and a flat-sided nut threadedly recieved by and mounted upon said member, comprising:
    a hollow body having a rear wall and a smooth, continuous, forwardly converging outer surface extending forward from said rear wall, said body including a first continuous inner surface extending forward from said rear wall to define a rear opening for receiving said nut, a second continuous inner surface displaced forwardly from said first inner surface, said second inner surface being of a threaded tubular configuration adapted for threadedly receiving said end of said threaded member, and a threaded side opening extending between said outer surface and said rear opening;
    and a screw threadedly received by said side opening to engage a side of said nut.

2. A theft-proof cover for covering the end of a threaded member and a flat-sided nut threadedly received by and mounted upon said member, comprising:
    a hollow metal body having a rear wall and a smooth, continuous, forwardly converging outer surface extending forward from said rear wall, said body including a first continuous inner surface extending forward from said rear wall to define a rear opening for receiving said nut, a second continuous inner surface displaced forwardly from said first inner surface, said second inner surface being of a threaded tubular configuration adapted for threadedly receiving said end of said threaded member, a threaded side opening extending between said outer surface and said rear opening, and a pair of opposing slots in said outer surface adjacent said rear wall for receiving an open-end wrench to secure said body to said threaded member over said nut;
    and a screw threadedly received by said side opening to engage a flat side of said nut.

3. A theft-proof cover for covering the end of a threaded member and a flat-sided nut threadedly received and mounted upon said member, comprising:
    a hollow, cone-shaped body having a substantially flat rear wall and including a first substantially tubular inner surface extending coaxially forward from said rear wall to define a rear opening for receiving said nut and a second tubular inner surface extending coaxially from said first surface, said second inner surface being threaded to threadedly receive said end of said threaded member, and a threaded side opening extending between an outer surface of said body and said rear opening substantially normal to said outer surface;
    and a screw threadedly received by said side opening to engage a flat side of said nut.

4. The cover of claim 3 wherein said body portion includes a pair of opposing slots in said outer surface adjacent said rear wall for receiving an open-end wrench to secure said body to said threaded member over said nut.

References Cited by the Examiner

UNITED STATES PATENTS

| | | | |
|---|---|---|---|
| 579,151 | 3/1897 | Kearney | 151—29 |
| 1,254,514 | 1/1918 | Lehmann | 85—35 |
| 1,792,711 | 2/1931 | Rockstad | 85—32 |
| 1,940,455 | 12/1933 | Kilpela. | |
| 2,653,835 | 9/1953 | Nelson | 85—56 |
| 2,667,095 | 1/1954 | Manchester | 81—90.3 |
| 2,741,289 | 4/1956 | Grow | 85—45 |
| 2,746,317 | 5/1956 | Merriman. | |

FOREIGN PATENTS 493,860   5/1954   Italy.

CARL W. TOMLIN, *Primary Examiner.*

EDWARD C. ALLEN, *Examiner.*